June 13, 1961 J. A. DODD 2,988,002
DIFFERENTIAL CHECK VALVE STRUCTURE
Filed June 24, 1955
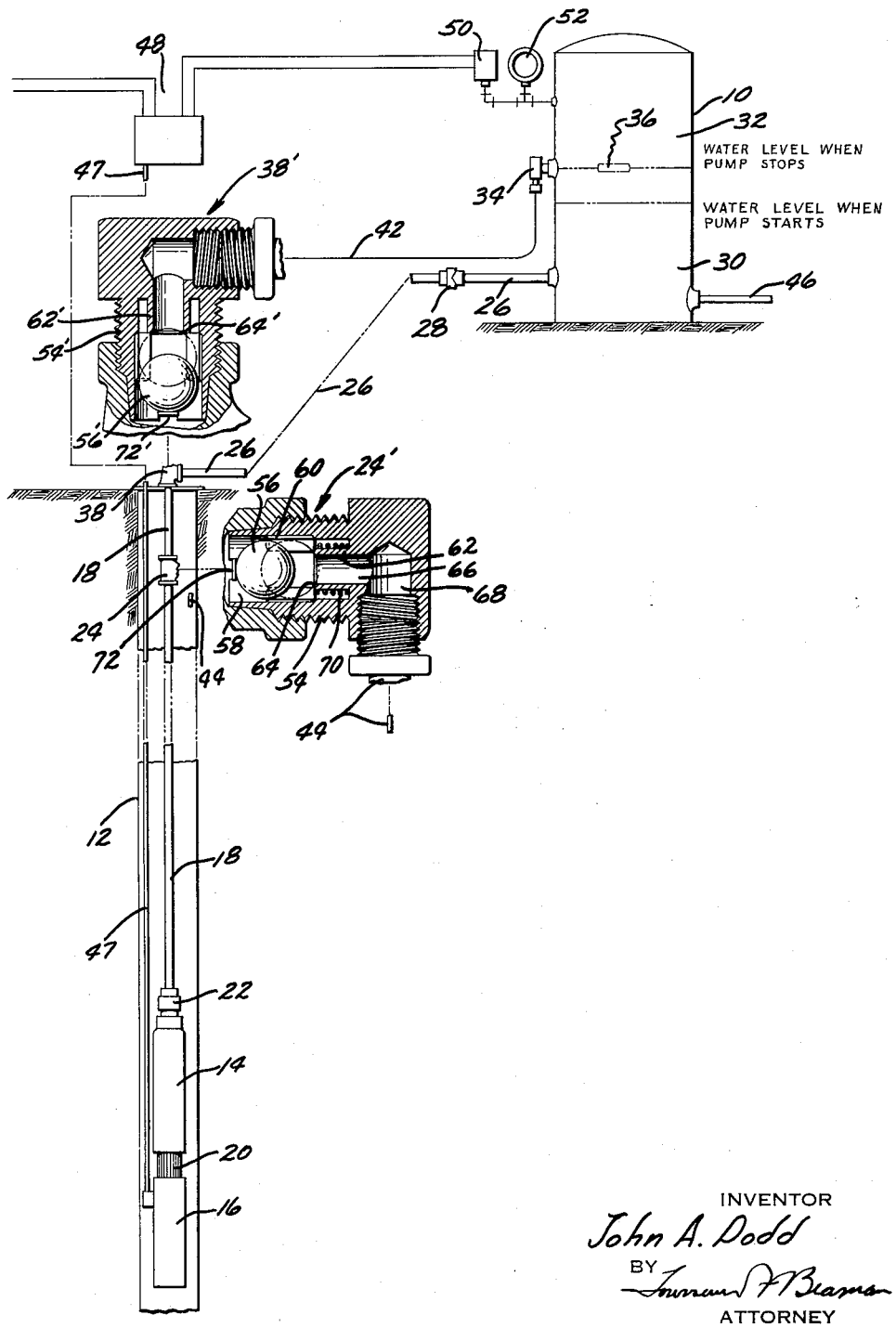
INVENTOR
John A. Dodd
BY
ATTORNEY – # United States Patent Office 2,988,002
Patented June 13, 1961

2,988,002
DIFFERENTIAL CHECK VALVE STRUCTURE
John A. Dodd, 299 Techwood Drive, NW., Atlanta, Ga.
Filed June 24, 1955, Ser. No. 517,756
2 Claims. (Cl. 103—7)

This invention relates to hydro-penumatic pump installations and in particular to check valves employed in said installations for controlling the admission of air to the hydro-pneumatic tanks.

Hydro-pneumatic tanks are of no value unless they contain air, and they must contain the maximum amount of air if they are to have the maximum volumetric efficiency.

It is an object of this invention to provide valve control means which can be installed in a hydro-pneumatic pump installation so as to be effective to add air to the hydro-pneumatic tank when needed.

It is a further object of the invention to provide a simple construction of check valve which can be employed in the pump discharge line of a hydro-pneumatic pump installation to open at a pre-determined pressure and close at a pre-determined lower pressure.

A further object of the invention is to provide valve means which can be installed in the pump discharge line of a hydro-pneumatic pump system so as to be effective to maintain a constant amount of air in the hydro-pneumatic tank.

Another object of the invention is to provide a valve suitable for the purpose described above, which has a differential snap action and a positive operation.

The above and other objects and advantages of the invention residing in the construction, arrangement and combination of parts will become clear from consideration of the following description with reference to the accompanying drawings and from consideration of the appended claims.

The accompanying drawing is a combined part section and part diagrammatic view of a typical hydro-pneumatic pump installation equipped with check valves according to the present invention, the said check valves being shown in the sectioned and enlarged portions of the figure in their proper locations with respect to the liquid discharge pipes and the latter being shown broken-away for ease of illustration.

In the drawings, 10 indicates the tank of a hydro-pneumatic pumping installation, of which the well is indicated at 12, a submersed pump at 14, a submersed motor at 16 and the pump discharge pipe at 18.

The water inlet to the pump 14 is shown at 20. The discharge pipe 18, at the outlet end of pump 14, is fitted with a check valve 22. Near its upper end pipe 18 is fitted with a fitting 24 communicating with a differential check valve indicated by the general reference 24' in the sectional showing of this valve.

At its upper end, vertical discharge pipe 18 connects with one end of a horizontal pipe 26 fitted, intermediate its ends, with a check valve 28 and delivering at its opposite end into the water space 30 of the tank 10, the air space of which tank is indicated at 32 and the volume of which air space is controlled by air volume control valve 34 and float 36.

At the junction of the upper end of pump discharge pipe 18 and horizontal pipe 26 there is fitted an elbow 38, this elbow communicates with a vacuum breaker valve indicated by the general reference 38' in the sectional showing of this valve.

Vacuum valve 38' is connected with float operated air volume control valve 34 by a pipe indicated by line 42.

Differential check valve 24' besides being connected with discharge pipe 18 is also connected with a drain pipe, indicated at 44.

46 indicates the tank water outlet pipe, 48 the electric supply and starter for the motor 16 and pump 14, 50 a pressure switch and 52 a pressure gage, these being conventional components of a hydro-pneumatic pump installation and including an electric conductor 47 connecting the starter 48 with the motor 16.

The differential check valve 24' has an externally screw-threaded pipe part 54 by which the valve is secured in the pump discharge pipe 18 so that a ball valve 56 faces this pipe. Ball valve 56 is guided for reciprocation within the enlarged bore portion 58 in which a longitudinally slotted guide sleeve 60 is fitted and which bore contains a concentric and tubular section 62 defining an annular seat 64 and a reduced bore portion 66 which communicates with another bore portion 68 connected with the drain line 44 (FIG. 1). A coil spring 70 is operative against ball 56 so as normally i.e. when the pump 14 is inoperative, to urge the ball away from its seat 64 to the position indicated in full lines in the sectional showing of this valve, the movement of the ball in this direction being arrested by contact of the ball with the inturned lugs 72.

The guide sleeve accurately guides the ball valve in its movement to its seat and the longitudinal slots in this guide sleeve permit the liquid to flow freely when the valve is in open position. This avoids valve chatter and excessive wear on the valve seat and gives a differential snap action and positive operation.

The vacuum breaker valve 38' is of similar construction to differential check valve 24' but omits the coil spring 70. Parts of the vacuum valve which correspond with parts of the differential check valve have been given the same reference numerals, but primed, so detail description thereof is thought to be unnecessary.

In operation, when pump 14 is operating, check valves 22 and 28 are open and the entire pump discharge pipes 18 and 26 are under pressure. In addition, the liquid pressure in pipe 18 forces the ball 56 against its seat 64 against the action of the spring 70 and the liquid pressure also forces the ball 56' of the vacuum breaker valve against its seat 64'. The pump operation is controlled by pressure switch 50, which starts the pump 14 at a pre-determined cut-in point and stops the pump at a pre-determined cut-out point. Water enters the tank 30 at a faster rate than it is being used and, accordingly, compresses the air in the tank space 32 and causes contacts (not shown) of pressure switch 50 to open and stop the pump 14, whereupon the liquid flow in pipes 18 and 26 ceases and check valves 22 and 28 commence to close. While check valves 22 and 28 are closing there is a reduced pressure in pipe 26 and the pressure at the location of valve 24' will approxiamtely correspond to the column of liquid above the valve 24', such column being usually from 1 to 5 feet.

The differential check valve 24' is so designed that its ball 56 will move to "open" position, under the influence of spring 70, when the pressure thereon is below the minimum tank pressure, such pressure corresponding to the level captioned "Water level when pump starts." At the instant the liquid flow in pipe 26 ceases and check valves 22 and 28 commence to close, the ball 56 of valve 24' will be moved suddenly to the open position, by the action of spring 70, and tend to create a vacuum in pipe 26, with attendant draining through valve 24' and drain pipe 44 of the liquid contained in the discharge pipe between this valve and the valve 38' when air volume control valve 34 has been opened by movement of the float 36 opening line 42 to the atmosphere. Upon the pressure in tank 30 falling to a pre-determined cut-in point, contacts in the pressure switch 50 close and start the pump 20. The resulting liquid flow in pipe 18 compresses the air in this pipe above the valve 24' and thus causes first the valve 38' and then the valve 24' to close by movement of their ball elements 56', 56 against their seats 64', 64, respectively, with the air previously admitted into the upper portion of pipe 18 and into pipe 26 being forced into the tank 30 through the pipe line 26. However, the construction and arrangement is such that as long as air control valve 34 remains closed due to the water level existing in tank 10 no air will be admitted along pipe line 42 into the pipes 26 and 18 but any deficiency of air in the tank allows the water level in the tank to rise and raise float 36 and thereby open air control valve 34. Accordingly, when the pump stops air will be admitted into the upper portion of pipe 18 through air control valve 34, pipe line 42 and vacuum breaker valve 38'.

As above indicated, the differential check valve 24' operates as follows: When the pump 14 starts the liquid pressure in pipe 18 moves ball 56 to its seat 64 against the action of coil spring 70 and closes the pipe 18 to the drain pipe 44. When the pump 14 stops, the resulting instantaneous drop in pressure in pipe 18 allows spring 70 to move ball 56 away from seat 64 and against lugs 72. In this position of the ball liquid in the discharge pipes above valve 24' flows around the ball and through bore portions 66, 68 to the drain pipe 44. The tension of spring 70 and the area of bore 66 are such that, in practice, the ball 56 will move to the open position under the action of its spring 70 when the pressure is between 10 and 15 lbs., in a system having a 20 lb. or higher cut-in pressure. When valve 24' is in the open position (being the full line position) the entire area of the ball 56 is subjected to the liquid pressure, less any back pressure due to liquid flowing through the bore 66 but since the area of bore 66 is much greater than the area of the liquid flow channels provided by the longitudinally slotted sleeve 60 such back pressure is small and the valve will close at a relatively small pressure, of for instance, about 4 lb.

The operation of the vacuum breaker valve 38' is similar to the operation of valve 24' except that it will close much more rapidly, due to the omission of the spring 70 and will thus provide that there is a minimum loss of entrained air. It will therefore be apparent that the valves 24' and 38' operate with a snap action both in the opening and closing thereof and fully open in the fraction of a second when check valves 22 and 28 are closing after pump 14 has stopped.

Having thus disclosed by invention, what I claim as novel and wish to secure by Letters Patent is as follows:

1. In a hydro-pneumatic pump installation including a hydro-pneumatic tank, a pump, a pipe line interconnecting the pump with said tank, a pressure differential snap acting check valve and a vacuum breaker valve in communication with said pipe line, said snap acting check valve controlling a drain passage communicating with said pipe line biasing means tending to open said differential check valve and maintaining said valve open against gravity head fluid pressure within said pipe line, said vacuum breaker valve arranged to quickly open under gravitational force, said vacuum breaker valve being vertically disposed above said pressure differential check valve, a check valve within said pipe line between said vacuum breaker valve and said tank, said check valve being constructed and arranged to open during operation of said pump and to close when said pump is inoperative, means associated with said tank sensing the air volume therein, an air valve mounted on said tank operatively associated with said means, said sensing means being interconnected with said air valve to selectively open said air valve to atmosphere in response to predetermined tank conditions, conduit means interconnecting said air valve and said vacuum breaker valve, said pressure differential valve and said vacuum breaker valve constructed and arranged to close upon operation of said pump due to the resultant pressure created in said pipe line and to fully open with a snap action during closing of said check valve whereby upon the need for air within said tank said air valve will permit atmospheric air to be drawn into said pipe line through said vacuum breaker valve as the fluid between said differential check valve and vacuum breaker valve drains from said pipe line through said differential check valve.

2. In a hydro-pneumatic pump installation as in claim 1, wherein said means associated with said tank sensing the air volume therein comprises a float within said tank operatively associated with said air valve.

References Cited in the file of this patent

UNITED STATES PATENTS

| | | |
|---|---|---|
| 2,136,898 | Thomas | Nov. 15, 1938 |
| 2,327,601 | Kent | Aug. 24, 1943 |
| 2,347,472 | Dorward | Apr. 25, 1944 |
| 2,354,811 | Jacuzzi | Aug. 1, 1944 |
| 2,469,505 | Keefer | May 10, 1949 |
| 2,473,726 | Payne | June 21, 1949 |
| 2,642,747 | Le Van | June 23, 1953 |
| 2,660,954 | Weber | Dec. 1, 1953 |
| 2,720,839 | Chenault | Oct. 18, 1955 |
| 2,787,220 | Patterson et al. | Apr. 2, 1957 |
| 2,807,214 | Patterson | Sept. 24, 1957 |
| 2,829,597 | Patterson | Apr. 8, 1958 |
| 2,835,200 | Mann et al. | May 20, 1958 |